United States Patent
Ando

(10) Patent No.: US 12,273,640 B2
(45) Date of Patent: Apr. 8, 2025

(54) IMAGING ELEMENT AND IMAGING DEVICE

(71) Applicant: NIKON CORPORATION, Tokyo (JP)

(72) Inventor: Ryoji Ando, Sagamihara (JP)

(73) Assignee: NIKON CORPORATION, Tokyo (JP)

( * ) Notice: Subject to any disclaimer, the term of this patent is extended or adjusted under 35 U.S.C. 154(b) by 15 days.

(21) Appl. No.: 17/764,771

(22) PCT Filed: Sep. 30, 2020

(86) PCT No.: PCT/JP2020/037288
§ 371 (c)(1),
(2) Date: Mar. 29, 2022

(87) PCT Pub. No.: WO2021/066064
PCT Pub. Date: Apr. 8, 2021

(65) Prior Publication Data
US 2022/0385844 A1   Dec. 1, 2022

(30) Foreign Application Priority Data

Sep. 30, 2019 (JP) .................. 2019-180780

(51) Int. Cl.
*H04N 25/709* (2023.01)
*H04N 25/60* (2023.01)
*H04N 25/75* (2023.01)

(52) U.S. Cl.
CPC .......... *H04N 25/709* (2023.01); *H04N 25/60* (2023.01); *H04N 25/75* (2023.01)

(58) Field of Classification Search
CPC ...... H04N 25/709; H04N 25/60; H04N 25/75; H04N 25/77; H04N 25/79; H04N 25/616;
(Continued)

(56) References Cited

U.S. PATENT DOCUMENTS

2004/0155973 A1   8/2004   Bea et al.
2006/0279650 A1   12/2006  Watanabe et al.
(Continued)

FOREIGN PATENT DOCUMENTS

EP    3664440 A1     6/2020
JP    2004-222273 A  8/2004
(Continued)

OTHER PUBLICATIONS

May 9, 2023 Office Action issued in Japanese Patent Application No. 2021-551415.
(Continued)

*Primary Examiner* — Joel W Fosselman
(74) *Attorney, Agent, or Firm* — Oliff PLC

(57) ABSTRACT

An imaging element includes a first substrate that is provided with a photoelectric conversion unit which generates an electric charge by photoelectric conversion, a signal line to which a signal based on the electric charge generated by the photoelectric conversion unit is output, and a supply unit which supplies a voltage to the signal line such that a voltage of the signal line does not fall below a predetermined voltage, and a second substrate that is provided with a processing unit which processes the signal output to the signal line and is stacked on the first substrate.

20 Claims, 7 Drawing Sheets

(58) Field of Classification Search
CPC ........ H04N 23/54; H04N 23/50; H04N 23/55; H04N 25/70
See application file for complete search history.

(56) References Cited

U.S. PATENT DOCUMENTS

| | | | | |
|---|---|---|---|---|
| 2012/0228609 | A1* | 9/2012 | Okita | H04N 25/76 257/E21.531 |
| 2016/0021321 | A1* | 1/2016 | Kim | H04N 25/40 348/308 |
| 2016/0064442 | A1* | 3/2016 | Takada | H04N 25/616 250/208.1 |
| 2016/0065876 | A1* | 3/2016 | Juen | H01L 27/14634 348/302 |
| 2016/0358958 | A1* | 12/2016 | Miyoshi | H04N 25/70 |
| 2018/0054580 | A1* | 2/2018 | Adachi | H04N 25/65 |
| 2018/0084206 | A1 | 3/2018 | Saito et al. | |
| 2018/0098005 | A1* | 4/2018 | Hanzawa | H04N 25/76 |
| 2018/0376093 | A1* | 12/2018 | Tsukuda | H01L 27/14612 |
| 2020/0244907 | A1* | 7/2020 | Ueno | H04N 25/79 |
| 2020/0252603 | A1* | 8/2020 | Steadman | H04N 17/002 |
| 2021/0021777 | A1* | 1/2021 | Kobayashi | H04N 25/677 |

FOREIGN PATENT DOCUMENTS

| | | |
|---|---|---|
| JP | 2011-160046 A | 8/2011 |
| JP | 2013-141301 A | 7/2013 |
| JP | 2018-046484 A | 3/2018 |
| JP | 2019-030002 A | 2/2019 |
| WO | 2016/158484 A1 | 10/2016 |

OTHER PUBLICATIONS

Dec. 8, 2020 International Search Report issued in Patent Application No. PCT/JP2020/037288.
Dec. 8, 2020 Written Opinion of the International Searching Authority issued in Patent Application No. PCT/JP2020/037288.
Sep. 26, 2023 Office Action issued in Chinese Patent Application No. 202080067636.1.
Jul. 11, 2024 Office Action issued in Chinese Patent Application No. 202080067636.1.

* cited by examiner

IMAGING ELEMENT AND IMAGING DEVICE

TECHNICAL FIELD

The present invention relates to an imaging element and an imaging device.

BACKGROUND ART

An imaging element provided with a transistor for clamping a signal output from a pixel to a predetermined voltage level for each column is known (Patent Literature 1).

Conventionally, improvement in image quality has been required.

CITATION LIST

Patent Literature

[Patent Literature 1]
Japanese Unexamined Patent Application, First Publication No. 2004-222273

SUMMARY OF INVENTION

According to a first aspect, an imaging element includes a first substrate that is provided with a photoelectric conversion unit which generates an electric charge by photoelectric conversion, a signal line to which a signal based on the electric charge generated by the photoelectric conversion unit is output, and a supply unit which supplies a voltage to the signal line such that a voltage of the signal line does not fall below a predetermined voltage, and a second substrate that is provided with a processing unit which processes the signal output to the signal line and is stacked on the first substrate.

According to a second aspect, an imaging device includes the imaging element of the first aspect and a generation unit configured to generate image data on the basis of a signal processed by the processing unit.

DESCRIPTION OF EMBODIMENTS

First Embodiment

Figure 1:
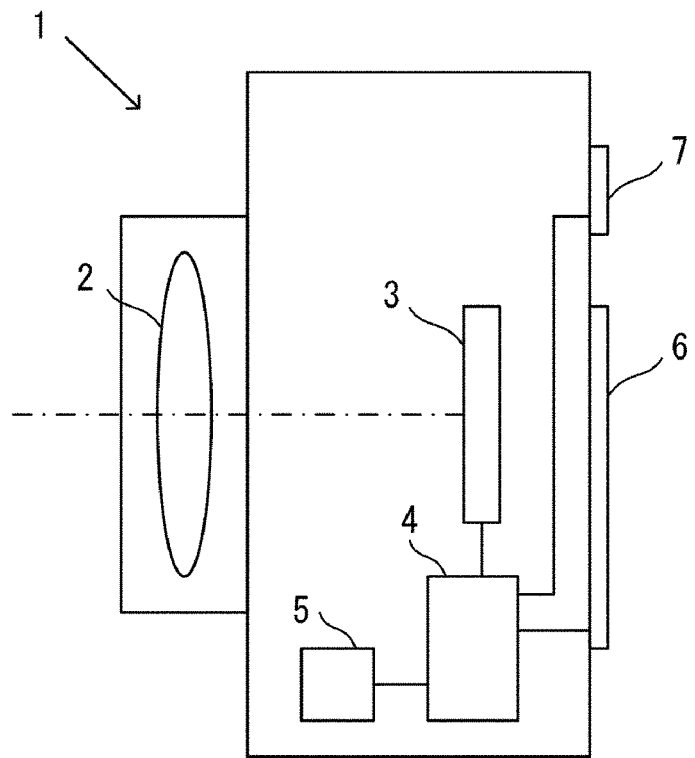
FIG. 1 is a diagram which shows a configuration example of an imaging device according to a first embodiment.

FIG. 1 is a diagram which shows a configuration example of a camera 1, which is an example of an imaging device according to a first embodiment. The camera 1 includes a photographing optical system (image formation optical system) 2, an imaging element 3, a control unit 4, a memory 5, a display unit 6, and an operation unit 7. The photographing optical system 2 has a plurality of lenses including a focus adjusting lens (focus lens) and an aperture diaphragm, and forms a subject image on the imaging element 3. The photographing optical system 2 may be detachable from the camera 1.

The imaging element 3 is an imaging element such as a CMOS image sensor or a CCD image sensor. The imaging element 3 receives a light beam that has passed through the photographing optical system 2 and captures a subject image formed by the photographing optical system 2. In the imaging element 3, a plurality of pixels having a photoelectric conversion unit are arranged in a two-dimensional shape (a row direction and a column direction). The photoelectric conversion unit is configured by a photodiode (PD). The imaging element 3 photoelectrically converts the received light to generate a signal, and outputs the generated signal to the control unit 4.

The memory 5 is a recording medium such as a memory card. Image data, a control program, and the like are recorded in the memory 5. Writing data to the memory 5 and reading data from the memory 5 are controlled by the control unit 4. The display unit 6 displays an image based on image data, information on photographing such as a shutter speed and an aperture value, a menu screen, and the like. The operation unit 7 includes various setting switches such as a release button, a power supply switch, a switch for switching between various modes, and the like, and outputs a signal based on each operation to the control unit 4.

The control unit 4 is configured by a processor such as a CPU, an FPGA, or an ASIC, and a memory such as a ROM or a RAM, and controls each part of the camera 1 based on a control program. The control unit 4 supplies a signal for controlling the imaging element 3 to the imaging element 3 to control an operation of the imaging element 3. The control unit 4 causes the imaging element 3 to capture the subject image and to output a signal when it photographs a still image, when it photographs a moving image, when it displays a through image (live view image) of a subject on the display unit 6, and the like.

The control unit 4 performs various types of image processing on a signal output from the imaging element 3 to generate image data. The control unit 4 is also a generation unit 4 that generates image data, and generates still image data and dynamic image data on the basis of the signal output from the imaging element 3. The image processing includes image processing such as gradation conversion processing and color interpolation processing.

Figure 2:
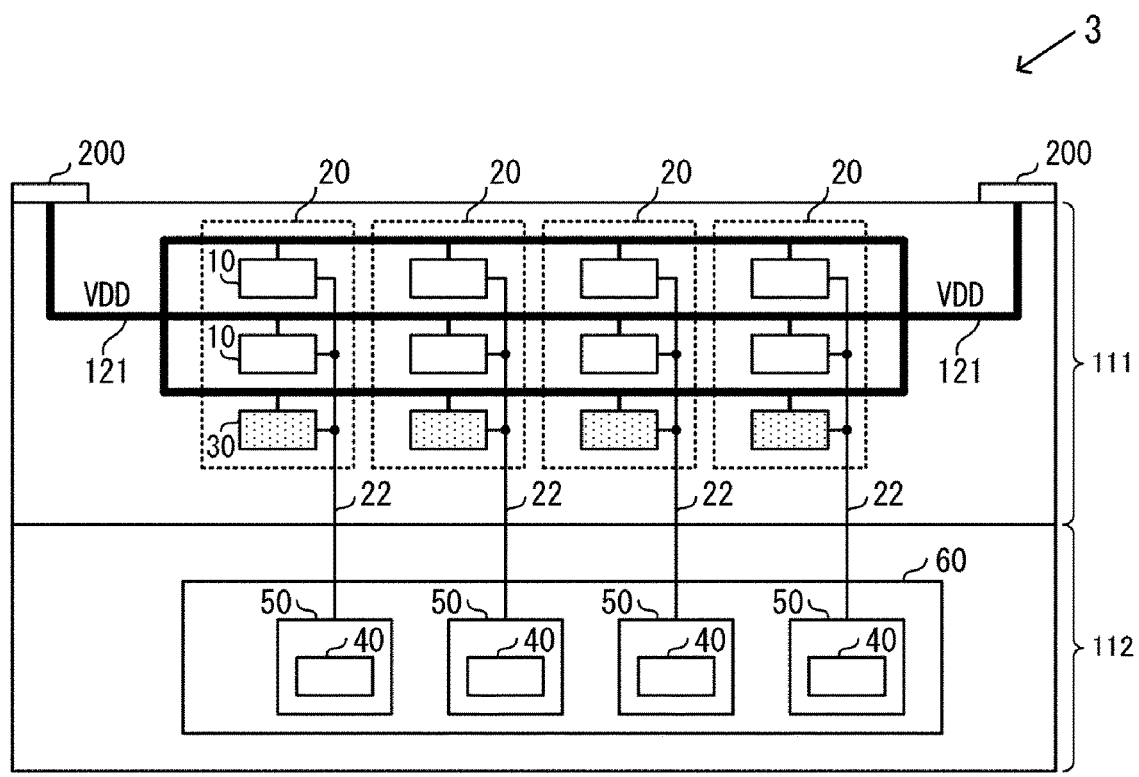
FIG. 2 is a block diagram which shows a configuration example of an imaging element according to the first embodiment.

FIG. 2 is a block diagram which shows a configuration example of the imaging element according to the first embodiment. The imaging element 3 is configured by stacking a first substrate 111 provided with a plurality of pixels 10 and a second substrate 112 provided with a reading unit 60. Each of the first substrate 111 and the second substrate 112 is configured by using a semiconductor substrate. A circuit provided on the first substrate 111 and a circuit provided on the second substrate 112 are electrically connected by connection units such as an electrode and a bump.

The first substrate 111 has a plurality of regions 20 in which each of a plurality of pixels 10 are arranged. In the example shown in FIG. 2, four regions 20 are shown. Each of these four regions 20 indicates one region when a region in which the pixels 10 of the first substrate 111 are arranged is divided into regions including a predetermined number of pixels. The regions 20 may or may not partially overlap. The number of pixels in each region 20 may be 4 pixels of 2 pixels×2 pixels, or 16 pixels of 4 pixels×4 pixels, and may be any number. In the following description, the region 20 is referred to as a pixel block 20.

The first substrate 111 is provided with a signal line 22 and a supply unit 30, which will be described below, for each pixel block 20. In addition, as will be described below, the first substrate 111 is provided with a pixel control unit and a supply control unit for each pixel block 20. The signal line 22 is a signal line connecting the pixel block 20 and the reading unit 60, and a signal is output from the pixel 10. The signal line 22 is a signal line using the connection unit such as an electrode and a bump.

The reading unit 60 has a processing unit 50 including an analog to digital conversion unit (AD conversion unit) 40. The processing unit 50 is provided for each pixel block 20. In the imaging element 3 according to the present embodiment, reading of pixel signals from the plurality of pixel blocks 20 is performed in parallel by using the signal lines 22 provided for each of the pixel blocks 20. The reading unit 60 can output the pixel signals of each pixel block 20 to the processing unit 50 provided for each pixel block 20 at the same time (in parallel), and can simultaneously process the pixel signals in each processing unit 50. Since each processing unit 50 simultaneously processes signals output from each pixel block 20, the reading unit 60 can perform high-speed signal processing.

The AD conversion unit 40 of the processing unit 50 converts a pixel signal, which is an analog signal input from each pixel 10 of the pixel blocks 20 via the signal line 22, into a digital signal. The processing unit 50 may have an amplifier that amplifies the pixel signal input via the signal line 22 with a predetermined gain (amplification rate). In this case, the AD conversion unit 40 converts the pixel signal amplified by the amplifier into a digital signal.

The pixel signal converted into a digital signal is subjected to signal processing such as correlated double sampling (CDS) and processing of correcting a signal amount, and is then output to the control unit 4 of the camera 1 in the processing unit 50. Signal processing such as correlation double sampling for the pixel signal may be performed by a signal processing unit (not shown). In this case, the processing unit 50 outputs the pixel signal converted into a digital signal by the AD conversion unit 40 to the signal processing unit. The signal processing unit performs signal processing such as correlation double sampling on the input pixel signal, and then outputs the processed pixel signal to the control unit 4.

A plurality of electrodes (pads) 200 to which a power supply voltage VDD is supplied (applied) are provided around regions in which the pixels 10 are arranged on the first substrate 111. The electrodes 200 are connected to the plurality of pixels 10 and the supply unit 30 arranged on the first substrate 111 via a wiring (power supply line) 121. The power supply voltage VDD is supplied to the pixels 10 and the supply unit 30 via the power supply line 121. The electrodes 200 are electrodes common to the plurality of pixels 10 and the supply unit 30, and are arranged on one surface of the first substrate 111 as shown in FIG. 2.

In the following description, a configuration of the imaging element 3 according to the present embodiment will be further described with reference to the drawings.

Figure 3:
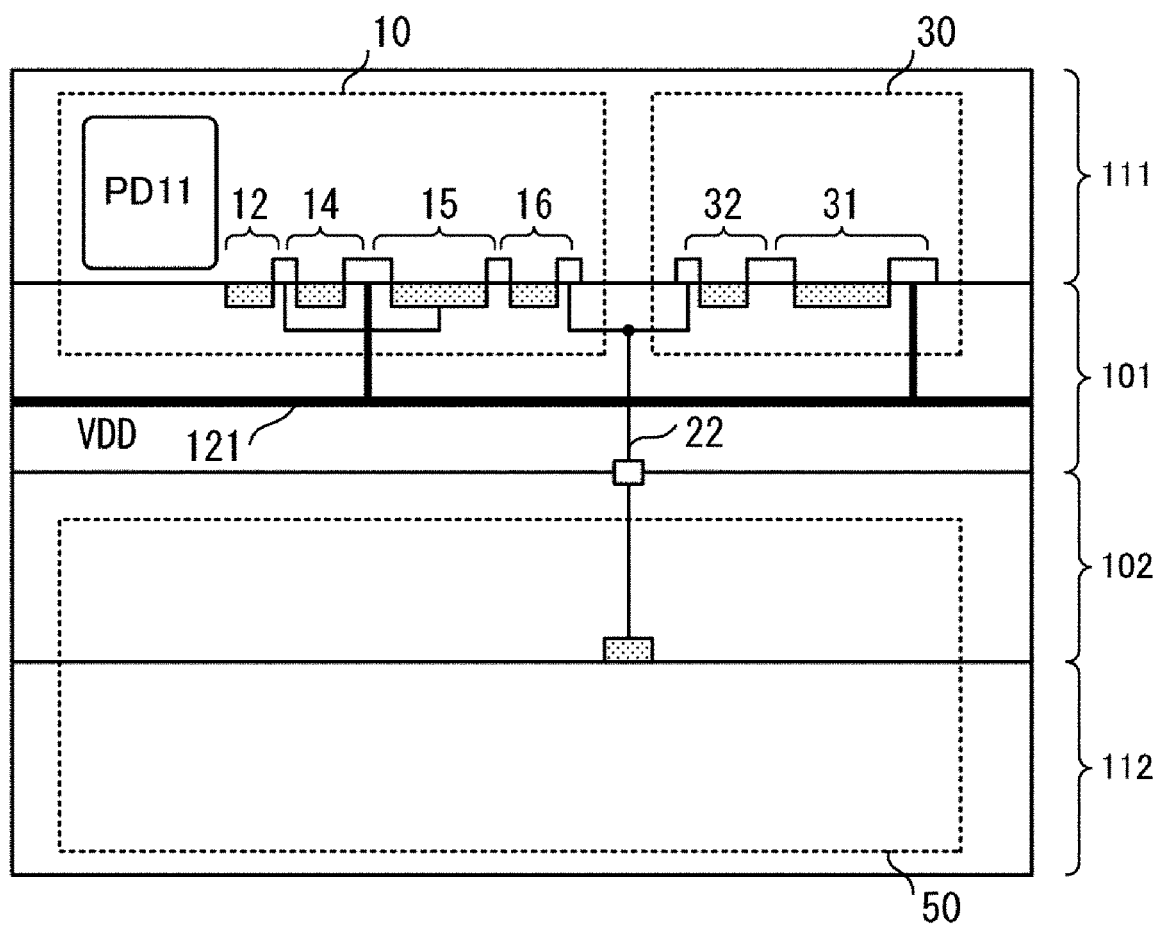
FIG. 3 is a diagram which shows an example of a cross-sectional structure of a part of the imaging element according to the first embodiment.
Figure 4:
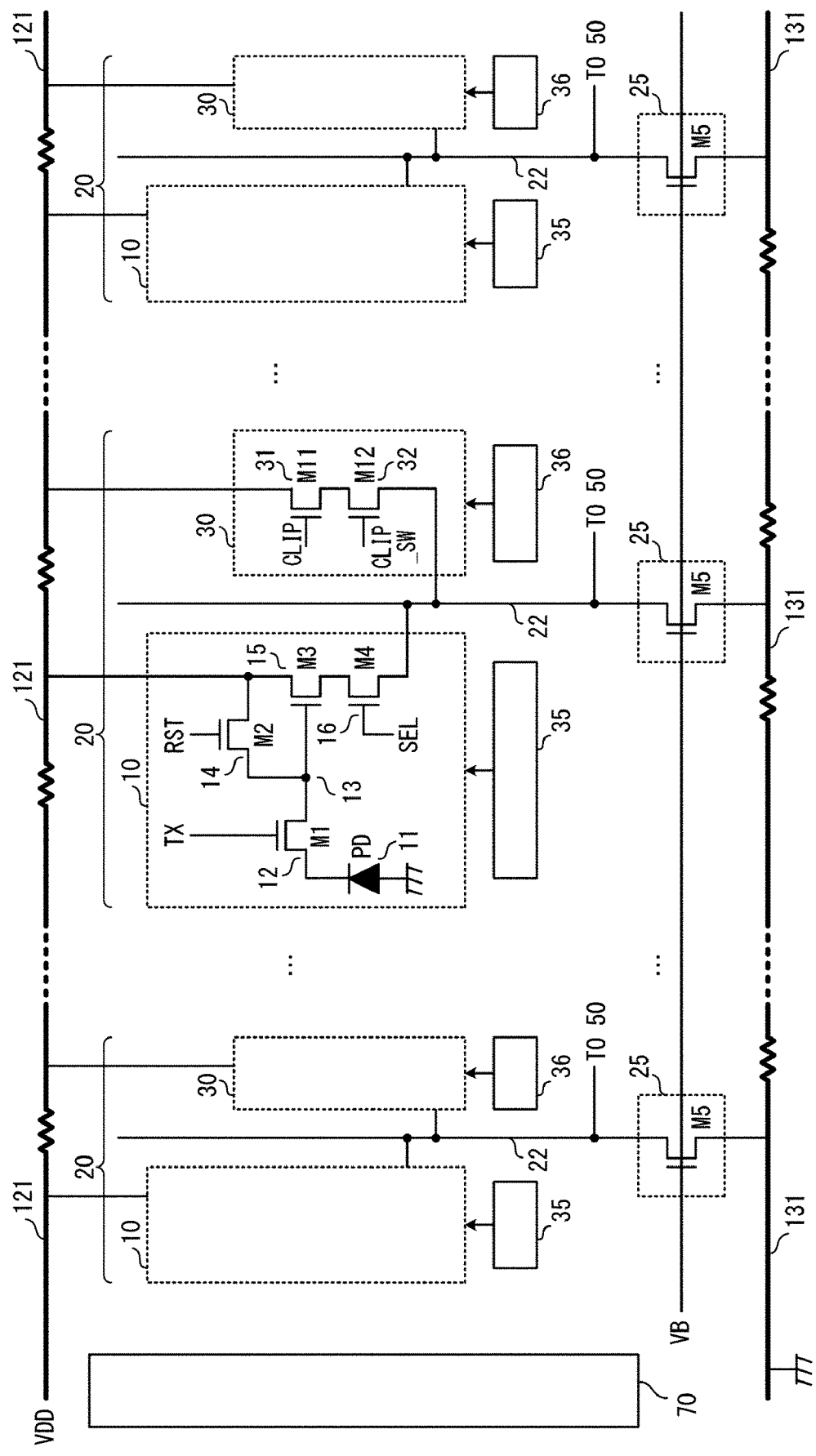
FIG. 4 is a diagram which shows a configuration example of a part of the imaging element according to the first embodiment.

FIG. 3 is a diagram which shows an example of a cross-sectional structure of a part of the imaging element according to the first embodiment. FIG. 4 is a diagram which shows a configuration example of a part of the imaging element according to the first embodiment. The imaging element 3 shown in FIG. 3 is a back-side irradiation type imaging element. The imaging element 3 includes a first substrate 111, a wiring layer 101 provided to be stacked on the first substrate 111, a second substrate 112, and a wiring layer 102 provided to be stacked on the second substrate 112. The wiring layer 101 and the wiring layer 102 are wiring layers including a conductor film (metal film) and an insulating film, respectively, and a plurality of wirings, vias, interlayer insulating films, and the like are arranged.

Light from a subject is incident in a Z-axis positive direction in FIG. 3. In addition, as shown in coordinate axes of FIG. 3, a right direction of a paper surface orthogonal to a Z axis is defined as an X-axis positive direction, and a forward direction of the paper surface orthogonal to the Z axis and an X axis is defined as a Y-axis positive direction. In the following drawings, the coordinate axes may be displayed such that a direction of each drawing may be understood with reference to the coordinate axes of FIG. 3. In the first substrate 111 and the wiring layer 101, a plurality of pixel blocks 20 including a plurality of pixels 10 and supply units 30 are arranged in the X-axis direction and the Y-axis direction. In the second substrate 112 and the wiring layer 102, a plurality of processing units 50 are arranged in the X-axis direction and the Y-axis direction.

FIG. 4 shows some of the plurality of pixels 10, some current sources 25 and supply units 30, some pixel control units 35 and supply control units 36, and a reading control unit 70 provided in the imaging element 3. The current source 25 and the supply unit 30 are provided for the signal line 22. The pixel control unit 35 and the supply control unit 36 are arranged for each pixel block 20. In FIG. 4, only one pixel 10 is shown for each pixel block 20 to simplify the drawing.

The pixel 10 has a photoelectric conversion unit 11, a transfer unit 12, a floating diffusion (FD) 13, a reset unit 14, an amplification unit 15, and a selection unit 16. The photoelectric conversion unit 11 is a photodiode PD, which converts incident light into an electric charge and stores the photoelectrically converted electric charge.

The transfer unit 12 is configured from a transistor M1 controlled by a signal TX, and transfers the electric charge photoelectrically converted by the photoelectric conversion unit 11 to the FD 13. The transistor M1 is a transfer transistor. The FD 13 stores (holds) the electric charge transferred to the FD 13 and converts it into a voltage divided by a capacitance value. The FD 13 is a storage unit 13 and stores the electric charge generated by the photoelectric conversion unit 11.

The amplification unit 15 is configured from a transistor M3 whose gate (terminal) is connected to the FD 13, and amplifies and outputs a signal of the electric charge stored in the FD 13. A drain (terminal) of the transistor M3 is connected to the electrode 200 (refer to FIG. 2) via the power supply line 121, and the power supply voltage VDD is supplied. A source (terminal) of the transistor M3 is connected to the signal line 22 via the selection unit 16. The amplification unit 15 functions as a part of a source follower circuit with the current source 25 as a load current source. The transistor M3 is an amplification transistor. The amplification unit 15 and the selection unit 16 configure an output unit that generates and outputs a signal based on the electric charge generated by the photoelectric conversion unit 11.

The reset unit 14 is configured from a transistor M2 controlled by a signal RST, and electrically connects or disconnects the FD 13 and the power supply line 121. The reset unit 14 resets the electric charge stored by the FD 13. The reset unit 14 discharges the electric charge stored in the FD 13 to reset a voltage of the FD 13. The transistor M2 is a reset transistor. The selection unit 16 is configured from a transistor M4 controlled by a signal SEL, and electrically connects or disconnects the amplification unit 15 and the signal line 22. The transistor M4 of the selection unit 16 outputs a signal from the amplification unit 15 to the signal line 22 when it is on. The transistor M4 is a selection transistor.

The current source 25 is configured to include a transistor M5 in which a signal VB is input to the gate. The current source 25 is connected to each pixel 10 and the supply unit 30 of the pixel block 20 via the signal line 22. The current source 25 generates a current on the basis of a signal level of the signal VB and supplies the generated current to the signal line 22, the pixel 10, and the supply unit 30. The current source 25 may be configured by two transistors connected by a cascode. The signal VB is generated by a signal generation unit (not shown). The signal generation unit is commonly connected to the current source 25 provided for each signal line 22, and supplies the signal VB to each current source 25. The gates of the transistors M5 of each current source 25 are electrically connected to each other, and the signal VB is input thereto from the signal generation unit.

A signal (a dark signal) when the voltage of the FD 13 is reset and a signal (a photoelectric conversion signal) based on the electric charge transferred from the photoelectric conversion unit 11 to the FD 13 by the transfer unit 12 are sequentially output to the signal line 22. A dark signal is used to remove noise contained in a photoelectric conversion signal. The dark signal can be said to be an analog signal indicating a reference level for the photoelectric conversion signal, and is used to correct the photoelectric conversion signal. The photoelectric conversion signal is an analog signal generated on the basis of the electric charge photoelectrically converted by the photoelectric conversion unit 11. The dark signal and the photoelectric conversion signal are input to the processing unit 50 (refer to FIG. 2) of the reading unit 60 via the signal line 22. In the present embodiment, the processing unit 50 has an arithmetic unit that performs subtraction of the photoelectric conversion signal and the dark signal, performs CDS by the subtraction of the photoelectric conversion signal and the dark signal, and removes a noise component from the photoelectric conversion signal.

The supply unit 30 has a signal output unit 31 and a switch unit 32 as shown in FIG. 4, and has a function of supplying a voltage to the signal line 22. The signal output unit 31 is configured from a transistor M11 in which a signal CLIP is input to the gate, and generates and outputs a signal having a voltage level based on the signal CLIP. A drain of the transistor M11 is connected to the electrode 200 (refer to FIG. 2) via the power supply line 121, and the power supply voltage VDD is supplied. A source of the transistor M11 is connected to the signal line 22 via the switch unit 32.

The switch unit 32 is configured from a transistor M12 controlled by a signal CLIP_SW, and electrically connects or disconnects the signal output unit 31 and the signal line 22. When the transistor M12 of the switch unit 32 is on, a signal from the signal output unit 31 can be output to the signal line 22. In the present embodiment, when the switch unit 32 is on, a voltage (a potential) of the signal line 22 is limited to a value within a range with a lower limit value of a voltage based on the signal CLIP by the signal output unit 31. The supply unit 30 supplies a voltage to the signal line 22 such that the voltage of the signal line 22 does not fall below a predetermined voltage. It can be said that the supply unit 30 is a limitation unit 30 that limits the voltage of the signal line 22. It can be said that the supply unit 30 supplies a voltage to the signal line 22 such that the voltage of the signal line 22 becomes a value from the power supply voltage VDD to a voltage based on the signal CLIP, and controls (adjusts) the voltage of the signal line 22.

The pixel control unit 35 is configured to include a switch and a buffer, and is controlled by the reading control unit 70. The pixel control unit 35 supplies signals such as the signal TX, the signal RST, and the signal SEL described above to the pixel 10 of the pixel block 20 to control the operation of each pixel 10. The pixel control unit 35 supplies a signal to the gate of each transistor of the pixel 10, and sets the transistors to be in the on state (a connected state, a conducting state, or a short-circuited state) or in an off state (a disconnected state, a non-conducting state, an open state, or a cut-off state).

The reading control unit 70 and the pixel control unit 35 control a period during which an electric charge is stored in the pixel block 20, and a reading timing of a pixel signal by controlling the signal TX, the signal SEL, and the like input to the pixel 10. The pixel control unit 35 provided for each pixel block 20 can control the pixel 10 such that an electric charge storage time is different for each pixel block 20, and can also control the pixel 10 such that the electric charge storage time is the same for all the pixel blocks 20. In addition, each pixel control unit 35 can control the pixel 10 such that a timing for reading a pixel signal is different for each pixel block 20, and can also control the pixel 10 such that the timing for reading a pixel signal is the same for all the pixel blocks 20. The pixel control unit 35 controls the pixel 10 such that the electric charge storage time is different for each pixel block 20, and thereby, even if there are a plurality of subjects, it is possible to capture an image according to a brightness of each subject. Moreover, the pixel control unit 35 controls the pixel 10 such that the timing for reading a pixel signal is different for each pixel block 20, and thereby, even if there are a plurality of subjects, it is possible to capture an image according to a moving speed of each subject.

The supply control unit 36 is configured to include a switch and a buffer, and is controlled by the reading control unit 70. As described above, the pixel control unit 35 can control the pixel 10 such that the electric charge storage time is different for each pixel block 20, and can control the pixel 10 such that the timing for reading a pixel signal is different for each pixel block 20. In that case, since a timing at which a signal is output to the signal line 22 is different for each block 20, the supply control unit 36 needs to control the operation of each switch unit 32 for each pixel block 20. The supply control unit 36 supplies the signal CLIP_SW described above to the switch unit 32 of the pixel block 20 to control the operation of each switch unit 32. The supply control unit 36 controls ON or OFF of the switch unit 32 to start and stop the supply of a voltage from the signal output unit 31 to the signal line 22. In the present embodiment, the supply control unit 36 provided for each pixel block 20 adjusts a timing for supplying a voltage from the signal output unit 31 to the signal line 22 in the pixel block 20 based on the timing for reading the dark signal and the photoelectric conversion signal in the pixel block 20. For example, the supply control unit 36 of each pixel block 20 controls the switch unit 32 such that it can supply a voltage to the signal line 22 provided for a certain pixel block 20 and the signal line 22 provided for another pixel block 20 at different timings. Each supply control unit 36 may control each switch unit 32 such that it can supply a voltage at the same timing in all the pixel blocks 20.

The reading control unit 70 is commonly provided in a plurality of pixel blocks 20. The reading control unit 70 is configured by a plurality of circuits including a timing generator and is arranged on the second substrate 112. The reading control unit 70 is controlled by the control unit 4 of the camera 1. The reading control unit 70 controls the operation of the pixel 10 by controlling the signals such as the signal TX, the signal RST, and the signal SEL input to the pixel 10 via the pixel control unit 35. In addition, the reading control unit 70 controls the operation of the supply unit 30 by controlling the signal CLIP_SW input to the supply unit 30 via the supply control unit 36.

The pixel control unit 35 and the supply control unit 36 described above may be arranged on one of the first substrate 111 and the second substrate 112, or may also be arranged separately on the first substrate 111 and the second substrate 112. The pixel control unit 35 and the supply control unit 36 may be arranged on different substrates from the first substrate 111 and the second substrate 112. The reading control unit 70 may be arranged separately on the first substrate 111 and the second substrate 112, or may be arranged on the first substrate 111. The reading control unit 70 may be arranged on a substrate different from the first substrate 111 and the second substrate 112.

When the selection unit 16 of the pixel 10 and the switch unit 32 of the supply unit 30 are turned on, respectively, the source of the amplification unit 15 and the source of the signal output unit 31 are electrically connected to the signal line 22. In this case, a current flowing path changes due to the current source 25 connected to the signal line 22 based on a magnitude relationship between a voltage of a gate of the amplification unit 15 (that is, the voltage of the FD 13) and a voltage of a gate of the supply unit 30 (that is, the voltage of the signal CLIP).

When the voltage of the FD 13 is higher than the voltage of the signal CLIP, a current of the current source 25 flows mainly to the amplification unit 15 via the signal line 22 and the selection unit 16. The amplification unit 15 outputs a signal based on the voltage of the FD 13 to the signal line 22. As a result, the voltage of the signal line 22 becomes a voltage corresponding to the voltage of the FD 13. When the voltage of the FD 13 is lower than the voltage of the signal CLIP, the current of the current source 25 flows mainly to the signal output unit 31 via the signal line 22 and the switch unit 32. At this time, the signal output unit 31 limits the voltage of the signal line 22 to a voltage based on the voltage of the signal CLIP by outputting a signal based on the voltage of the signal CLIP to the signal line 22. The voltage of the signal line 22 becomes the voltage corresponding to the voltage of the signal CLIP.

In this manner, the supply unit (limitation unit) 30 limits the voltage of the signal line 22 according to the voltage of the FD 13 and the voltage of the signal CLIP when the switch unit 32 is in the on state. The transistor M11 of the supply unit 30 is a transistor that limits (clip) the voltage of the signal line 22, and may be referred to as a clip transistor or a clamp transistor. When the voltage of the FD 13 is relatively low, the voltage of the signal line 22 is limited to the voltage based on the signal CLIP. As a result, it is possible to prevent the voltage of the signal line 22 from dropping and the current source 25 from operating abnormally. As a result, it is possible to prevent the current of the current source 25 from not being supplied. In addition, it is possible to prevent the voltage of the signal line 22 from being a voltage outside an assumed range and being input to the reading unit 60.

In addition, in the imaging element 3 according to the present embodiment, the signal CLIP with a different signal level is input to the supply unit 30 depending on whether the dark signal is read or the photoelectric conversion signal is read. As a result, the supply unit 30 can supply different voltages to the signal line 22 depending on whether the dark signal is read or the photoelectric conversion signal is read.

When the dark signal is read, a first voltage V1 is supplied to a gate of the transistor M11 of the signal output unit 31. In this case, the voltage of the signal line 22 is limited such that a voltage based on the first voltage V1 becomes the lower limit. As a result, a voltage of a signal output to the reading unit 60 as a dark signal is limited. When the photoelectric conversion signal is read, a second voltage V2 lower than the first voltage V1 is supplied to the gate of the transistor M11. In this case, the voltage of the signal line 22 is limited such that a voltage based on the second voltage V2 becomes the lower limit. As a result, a voltage of a signal output to the reading unit 60 as a photoelectric conversion signal is limited.

The electric charge may be stored in the FD 13 due to the defect of the pixel, and the voltage of the dark signal may drop. When a subject with high brightness is photographed, an electric charge may be stored in the FD 13 and the voltage of the dark signal may drop. In such a case, a difference between the dark signal and the photoelectric conversion signal is small, and an image quality of an image generated by using a signal after CDS processing can deteriorate. In the present embodiment, as described above, the voltage of the dark signal can be limited to secure a difference between a signal level of the dark signal and a signal level of the photoelectric conversion signal. For this reason, it is possible to suppress a deterioration of the image quality caused by the small difference between the dark signal and the photoelectric conversion signal.

The second voltage V2 described above is set such that the voltage of the signal line 22 does not fall below a voltage required for the operation of the transistor M5 of the current source 25, and the voltage of the signal line 22 may take a voltage as low as possible. As a result, it is possible to suppress a hindrance of a change in the voltage of the signal line 22 that occurs when the electric charge generated by the photoelectric conversion unit 11 is transferred to the FD 13. Moreover, it is possible to suppress a fluctuation of a current of the current source 25 and to suppress mixing of noise into the photoelectric conversion signal output to the signal line 22.

Figure 5:
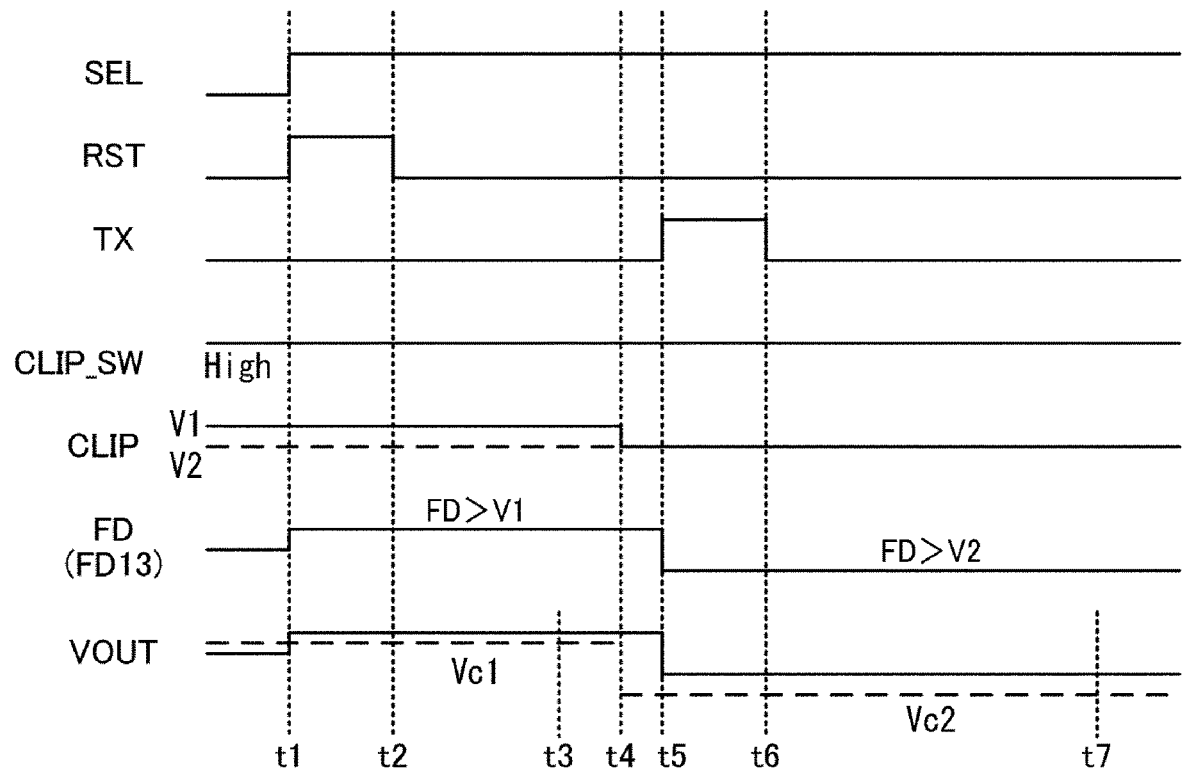
FIG. 5 is a timing chart which shows an operation example of the imaging element according to the first embodiment.
Figure 6:
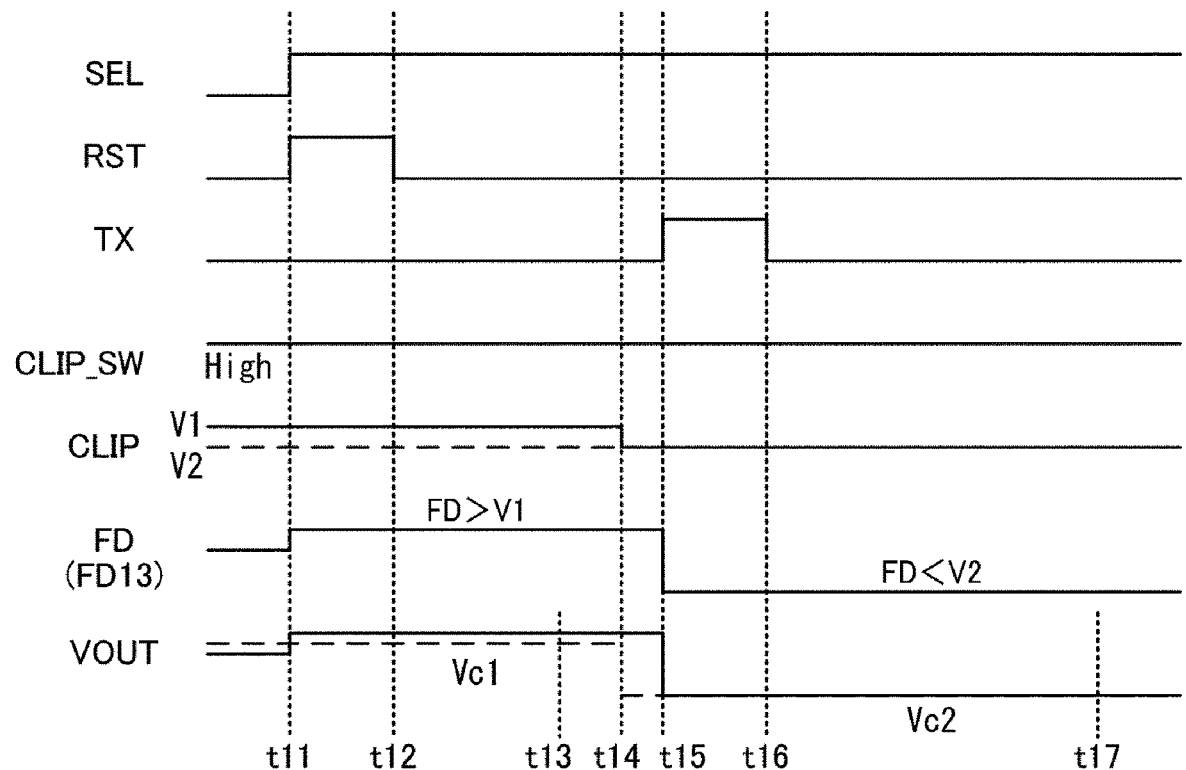
FIG. 6 is a timing chart which shows the operation example of the imaging element according to the first embodiment.

FIG. 5 and FIG. 6 are timing charts which show operation examples of the imaging element 3 according to the first embodiment, respectively. In the timing charts shown in FIGS. 5 and 6, a vertical axis indicates a voltage level of a signal, and a horizontal axis indicates a time. FD indicates a signal (a voltage signal) of the FD 13, and VOUT indicates a signal output to the signal line 22. In the examples shown in FIGS. 5 and 6, the signal CLIP_SW is set to a high level, and the switch unit 32 of the supply unit 30 is turned on. In FIGS. 5 and 6, a transistor to which a control signal (the signal SEL, the signal RST, or the signal TX) with a high level (for example, the power supply voltage VDD) is input is in the on state, and a transistor to which a control signal with a low level (for example, a ground voltage) is input is turned off.

At a time t1 shown in FIG. 5, when the signal RST is at a high level, the transistor M2 of the reset unit 14 of the pixel 10 is in the on state, and the FD 13 and the power supply line 121 are electrically connected. As a result, the electric charge of the FD 13 is reset, and the voltage of the FD 13 becomes a reset voltage. In addition, at the time t1, when the signal SEL is at a high level, the transistor M4 of the selection unit 16 is turned on. As a result, the amplification unit 15 and the selection unit 16 can output a signal based on a reset voltage of the pixel 10, that is, a signal after the electric charge of the FD 13 of the pixel 10 is reset, to the signal line 22. At a time t2, when the signal RST is at a low level, the transistor M2 of the reset unit 14 is turned off.

The signal output unit 31 of the supply unit 30 receives the signal CLIP of the first voltage V1, and is in a state in which it can supply the voltage based on the first voltage V1 (a clip voltage Vc1 shown by a broken line in FIG. 5) to the signal line 22. In the example shown in FIG. 5, the voltage of the FD 13 (the voltage of an FD shown in FIG. 5) is higher than the first voltage V1, which is the voltage of the signal CLIP, in the period from the time t2 to a time t3. For this reason, a voltage of a signal VOUT output to the signal line 22 is a voltage based on the voltage of the FD 13, that is, a voltage based on a reset voltage after the electric charge stored in the FD 13 is reset.

At the time t3, the processing unit 50 of the reading unit 60 samples the signal VOUT, which is the voltage based on the reset voltage, as the dark signal. It can be said that the voltage of the dark signal is fixed at the time t3. The AD conversion unit 40 of the processing unit 50 converts the dark signal into a digital signal. At a time t4, the signal CLIP of the second voltage V2, which is lower than the first voltage V1, is input to the signal output unit 31. The voltage of the signal CLIP changes from the first voltage V1 to the second voltage V2, and the signal output unit 31 is in a state in which it can supply the voltage based on the second voltage V2 (a clip voltage Vc2 shown by a broken line in FIG. 5) to the signal line 22.

At a time t5, when the signal TX is at a high level, the transistor M1 of the transfer unit 12 is in the on state, and the electric charge photoelectrically converted by the photoelectric conversion unit 11 is transferred to the FD 13. As a result, the voltage of the FD 13 becomes a voltage based on the electric charge transferred from the photoelectric conversion unit 11. Moreover, since the signal SEL is at a high level, the amplification unit 15 and the selection unit 16 are in a state in which they can output a signal based on the electric charge generated by the photoelectric conversion unit 11 to the signal line 22. At a time t6, when the signal TX is at a low level, the transistor M1 of the transfer unit 12 is turned off.

In the example shown in FIG. 5, the voltage of the FD 13 is higher than the second voltage V2, which is the voltage of the signal CLIP, in the period from the time t6 to a time t7. For this reason, the voltage of the signal VOUT output to the signal line 22 is a voltage based on the voltage of the FD 13, that is, a voltage based on the electric charge photoelectrically converted by the photoelectric conversion unit 11.

At the time t7, the processing unit 50 samples the signal VOUT, which is a voltage based on the electric charge photoelectrically converted by the photoelectric conversion unit 11, as a photoelectric conversion signal. It can be said that a voltage of the photoelectric conversion signal is fixed at the time t7. The AD conversion unit 40 of the processing unit 50 converts the photoelectric conversion signal into a digital signal. The processing unit 50 performs CDS that performs difference processing between the dark signal and the photoelectric conversion signal on the dark signal and the photoelectric conversion signal converted into digital signals. The processing unit 50 performs signal processing such as CDS processing, and then outputs a processed signal to the control unit 4.

Next, another example of the operation of the imaging element 3 will be described with reference to FIG. 6. At a time t11 shown in FIG. 6, when the signal RST is at a high level, the transistor M2 of the reset unit 14 of the pixel 10 is turned on. As a result, the electric charge of the FD 13 is reset, and the voltage of the FD 13 becomes a reset voltage. Moreover, at the time t11, when the signal SEL is at a high level, the transistor M4 of the selection unit 16 is turned on. As a result, the amplification unit 15 and the selection unit 16 can output a signal based on the reset voltage of the pixel 10 to the signal line 22. At a time t12, when the signal RST is at a low level, the transistor M2 of the reset unit 14 is turned off.

The signal output unit 31 of the supply unit 30 receives the signal CLIP of the first voltage V1, and is in a state in which it can supply a voltage based on the first voltage V1 (the clip voltage Vc1) to the signal line 22. In the example shown in FIG. 6, the voltage of the FD 13 is higher than the first voltage V1, which is the voltage of the signal CLIP, in a period from the time t12 to a time t13. For this reason, the voltage of the signal VOUT output to the signal line 22 is a voltage based on the reset voltage of the FD 13.

At the time t13, the processing unit 50 of the reading unit 60 samples the signal VOUT, which is a voltage based on the reset voltage, as the dark signal. The processing unit 50 converts the dark signal into a digital signal. At a time t14, the signal output unit 31 receives the signal CLIP of the second voltage V2, which is lower than the first voltage V1, and is in a state in which it can supply a voltage (the clip voltage Vc2) based on the second voltage V2 to the signal line 22.

At a time t15, when the signal TX is at a high level, the transistor M1 of the transfer unit 12 is turned on, and the electric charge photoelectrically converted by the photoelectric conversion unit 11 is transferred to the FD 13. As a result, the voltage of the FD 13 becomes a voltage based on the electric charge transferred from the photoelectric conversion unit 11. In addition, since the signal SEL is at a high level, the amplification unit 15 and the selection unit 16 are in a state in which they can output a signal based on the electric charge generated by the photoelectric conversion unit 11 to the signal line 22. At a time t16, when the signal TX is at a low level, the transistor M1 of the transfer unit 12 is turned off.

In the example shown in FIG. 6, the voltage of the FD 13 is lower than the second voltage V2, which is the voltage of the signal CLIP, in a period from the time t16 to a time t17. For this reason, the voltage of the signal VOUT output to the signal line 22 is limited to the voltage based on the second voltage V2, that is, the clip voltage Vc2.

At the time t17, the processing unit 50 samples the signal VOUT which serves as the clip voltage Vc2 as the photoelectric conversion signal. The processing unit 50 converts the photoelectric conversion signal into a digital signal. The processing unit 50 performs signal processing such as CDS processing using the dark signal and the photoelectric conversion signal converted into digital signals, and then outputs the processed signals to the control unit 4. As described above, in the present embodiment, the supply unit 30 receives the signal CLIP with different signal levels depending on whether the dark signal is read or when the photoelectric conversion signal is read. The supply unit 30 can limit the voltage of the signal line 22 by supplying a voltage to the signal line 22 according to the voltage of the signal CLIP and the voltage of the FD 13.

As shown in FIG. 4, gates of the transistors M5 of each current source 25 provided for each signal line 22 are commonly connected to the signal line to which the signal VB is input. Moreover, a parasitic capacitance (a load capacitance) may be added between the signal line 22 to which a pixel signal is output and the gate of the transistor M5 connected to the signal line 22. Due to the effect of this parasitic capacitance, the voltage of the signal VB may fluctuate according to a fluctuation of the voltage of the signal line 22, and a magnitude of a current flowing through each current source 25 may fluctuate. If the imaging element 3 does not have the supply unit 30, the voltage of the signal line 22 drops significantly and the voltage of the signal VB also drops significantly, and it is considered that a current supplied from the current source 25 will decrease or the current from the current source 25 will not be supplied. When the voltage of the signal line 22 provided for a certain pixel block 20 fluctuates, the voltage of the signal VB commonly supplied to each current source 25 fluctuates, and thereby the voltage of the signal line 22 provided for the other pixel blocks 20 may fluctuate.

On the other hand, in the imaging element 3 according to the present embodiment, the supply unit 30 is provided for each pixel block 20. The supply unit 30 can supply a voltage based on the signal CLIP to the signal line 22 when the switch unit 32 is in the on state, and can limit the voltage of the signal line 22. For this reason, the imaging element 3 can suppress the fluctuation of the voltage of the signal VB by limiting the voltage of the signal line 22. As a result, it is possible to suppress mixing of noise due to the fluctuation of the voltage of the signal VB into a signal (the photoelectric conversion signal, the dark signal) output to the signal line 22.

In the present embodiment, when the voltage of the FD 13 is relatively low, an operation of limiting the voltage of the signal line 22 (a clip operation) is performed, and, when the voltage of the FD 13 is relatively high, the clip operation is not performed. As described above, a path through which current flows by the current source 25 changes depending on whether the clip operation is performed. When the clip operation is performed, the current of the current source 25 flows between the power supply line 121 and the wiring (a ground line) 131 shown in FIG. 4 via the signal output unit 31 of the supply unit 30. If the clip operation is not performed, the current of the current source 25 flows between the power supply line 121 and the ground line (ground wiring) 131 via the amplification unit 15 of the pixel 10. Since wiring resistance is added to the power supply line 121 and the ground line 131 as schematically shown in FIG. 4, a voltage drop (IR drop) due to the wiring resistance occurs.

Due to an effect of a change in the current path described above, an amount of a voltage drop in the power supply line 121 and the ground line 131 changes depending on whether the clip operation is performed, and a difference in a value of the power supply voltage VDD given to each pixel 10 via the power supply line 121 may occur. When signals from the plurality of pixel blocks 20 are read at the same time, there is a difference in a pixel signal due to a fluctuation of the power supply voltage VDD between a pixel block 20 on which the clip operation is performed in other pixel blocks 20 while the signals are read and a pixel block 20 on which the clip operation is not performed in the other pixel blocks 20 while the signals are read. In addition, if the fluctuation of the power supply voltage VDD occurs when the photoelectric conversion signal is read, a signal level of the reset voltage of the FD 13, that is, a signal level that is a reference of a voltage change occurring according to the electric charge transferred from the photoelectric conversion unit 11, can fluctuate. If there is a difference in a signal level of the reset voltage between a period of reading the dark signal and a period of reading the photoelectric conversion signal, the CDS processing is performed using the dark signal with a signal level different from a signal level to be a reference of the photoelectric conversion signal, and, for example, blackout and streaking will occur in an image generated by using a signal after CDS processing. In particular, when the power supply voltage is supplied to the pixel 10 and the supply unit 30 from different electrodes via different power supply lines, it is considered that a difference in a value of a power supply voltage supplied to the pixel 10 is large between when the clip operation is performed and when the clip operation is not performed.

In the present embodiment, the pixel 10 and the supply unit 30 are arranged on the same first substrate 111. In addition, the power supply voltage VDD is supplied from the common electrode 200 to the pixel 10 and the supply unit 30 via the common power supply line 121. As a result, it is possible to reduce a difference in the power supply voltage VDD given to the pixel 10 between when the clip operation is performed and when the clip operation is not performed. For this reason, it is possible to suppress an occurrence of a difference in a signal of each pixel due to the fluctuation of the power supply voltage. As a result, it is possible to prevent blackout and streaking from occurring in an image generated by using a pixel signal.

Figure 7:
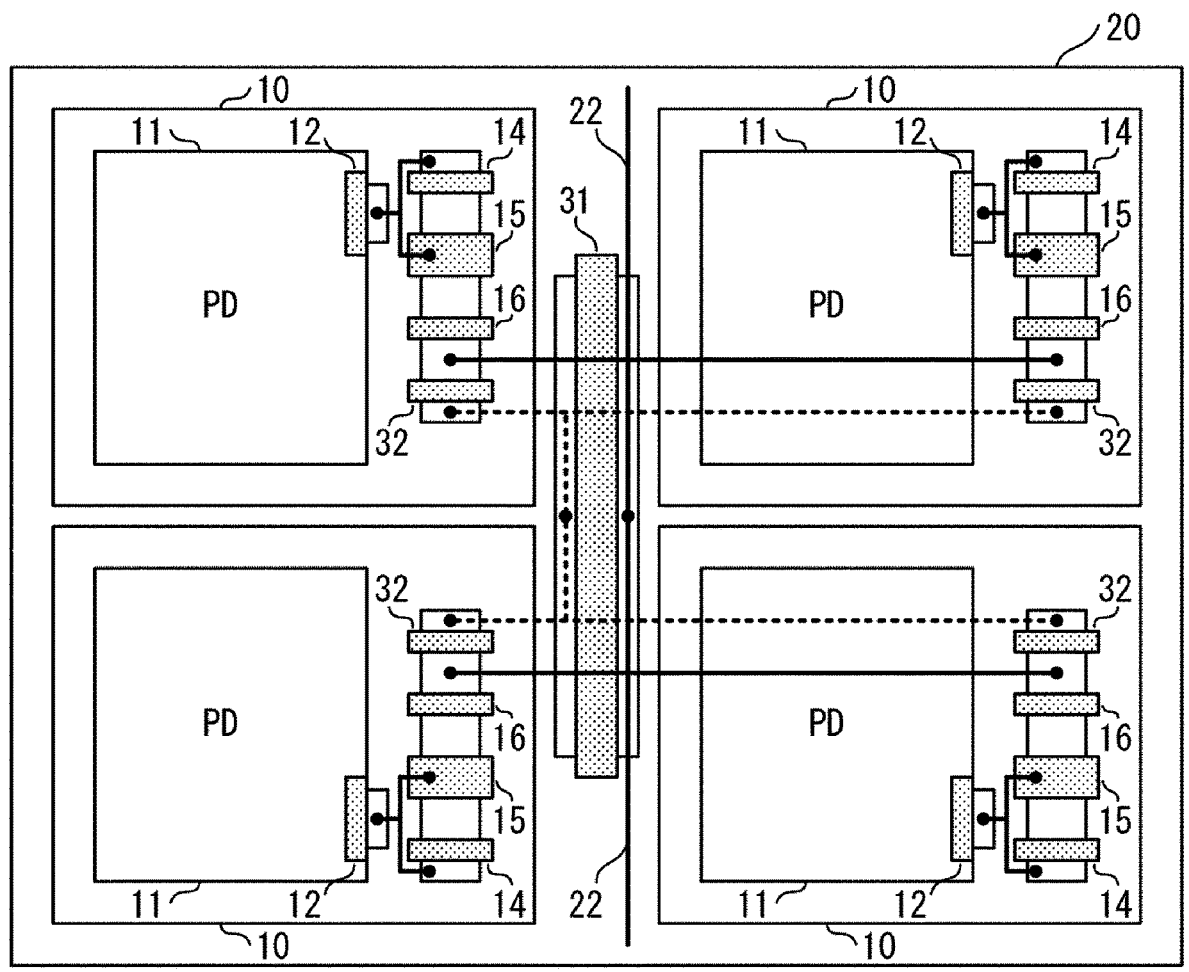
FIG. 7 is a diagram which shows an example of a layout of a part of the imaging element according to the first embodiment.
Figure 7:
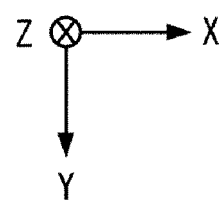

FIG. 7 is a diagram which shows an example of a layout of a part of the imaging element according to the first embodiment. In each of the plurality of pixel blocks 20 of the imaging element 3, a plurality of pixels 10 each including the photoelectric conversion unit 11 are arranged in a row direction (an X direction) which is a first direction and a column direction (a Y direction) which is a second direction intersecting the first direction. In the example shown in FIG. 7, the pixel block 20 is provided with four pixels 10, four switch units 32, and one signal output unit 31. On the first substrate 111 of the imaging element 3, a plurality of pixel blocks 20 each including four pixels 10 are arranged in a row direction (a horizontal direction) and a column direction (a vertical direction). Four switch units 32 and one signal output unit 31 constitute the supply unit 30. FIG. 7 schematically shows a part of a wiring provided in the pixel block 20.

In the example shown in FIG. 7, the signal output unit 31 is connected to each of the four switch units 32 and supplies a voltage to each of the four switch units 32. The clip operation is performed using one signal output unit 31 provided for each pixel block 20. For this reason, a light receiving area of the photoelectric conversion unit 11 can be increased as compared with a case in which a plurality of signal output units 31 are provided in the pixel block 20. It is possible to prevent the aperture ratio of a pixel from decreasing. In addition, it is possible to perform the clip operation without increasing the chip area, and to suppress the deterioration of the image quality of an image generated by using a pixel signal.

According to the embodiment described above, the following effects can be obtained.

(1) The imaging element 3 includes the first substrate 111 that is provided with the photoelectric conversion unit 11 which generates an electric charge by photoelectric conversion, the signal line 22 to which a signal based on the electric charge generated by the photoelectric conversion unit 11 is output, and the supply unit 30 which supplies a voltage to the signal line 22, and the second substrate 112 that is provided with the processing unit 50 which processes a signal output to the signal line 22 and is stacked on the first substrate 111. In the present embodiment, the pixel 10 having the photoelectric conversion unit 11 and the supply unit 30 are arranged on the same first substrate 111. For this reason, it is possible to reduce a fluctuation of a power supply voltage according to the operation of the supply unit 30 and to prevent a quality of a pixel signal from deteriorating. As a result, it is possible to suppress a deterioration of the image quality of an image generated by using a pixel signal.

(2) In the present embodiment, the reading unit 60 having a plurality of processing units 50 is arranged on the second substrate 112. For this reason, it is possible to arrange a plurality of circuits for processing a pixel signal without increasing a chip area. In addition, it is possible to suppress a decrease in the aperture ratio of a pixel.

The following modifications are also within the scope of the present invention, and one or a plurality of the modified examples can be combined with the embodiment described above.

MODIFIED EXAMPLE 1

Figure 8:
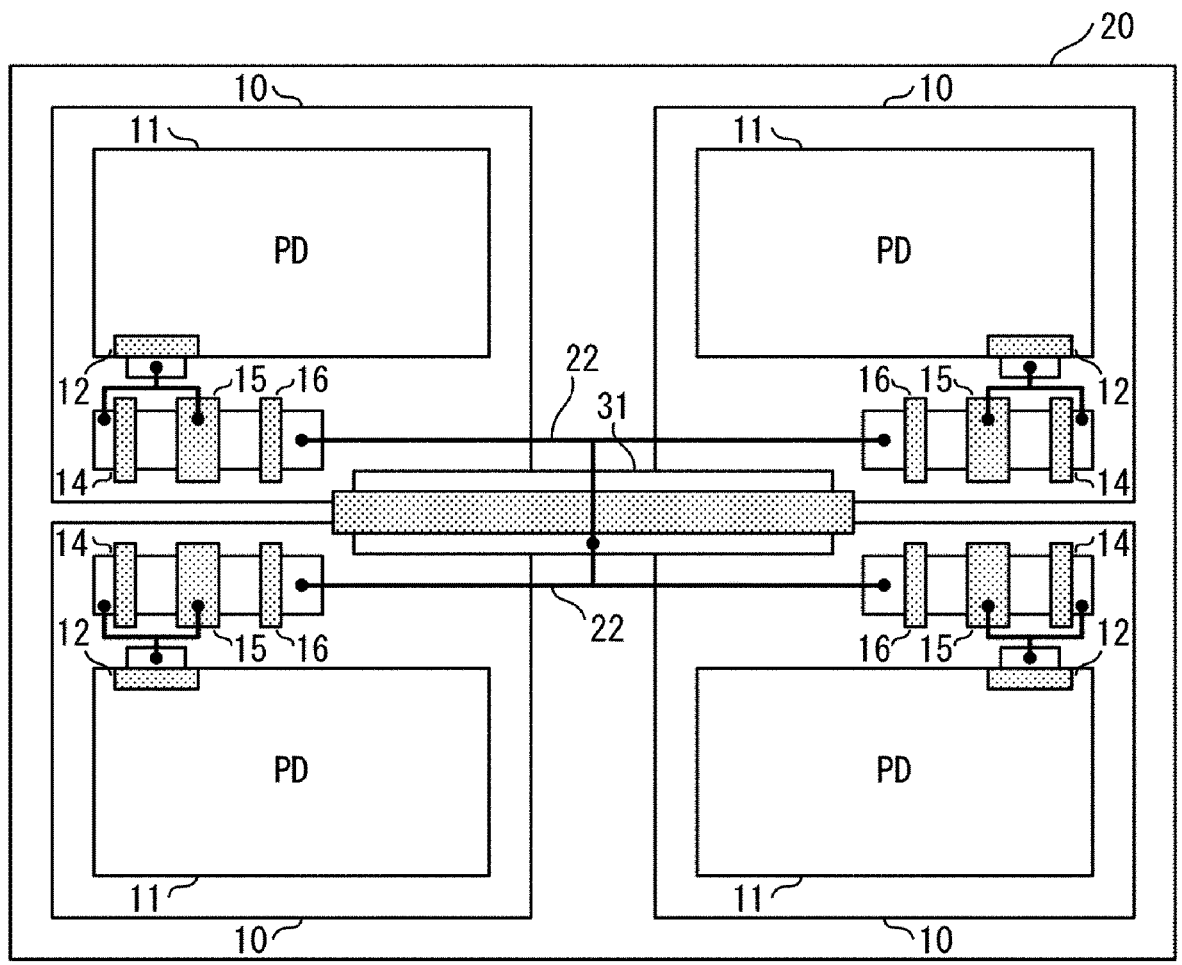
FIG. 8 is a diagram which shows an example of a layout of a part of an imaging element according to a modified example.
Figure 8:
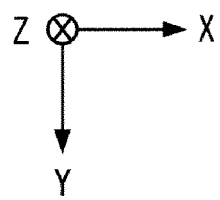

FIG. 8 is a diagram which shows an example of a layout of a part of the imaging element according to Modified example 1. As shown in FIG. 8, the pixel block 20 may be configured not to include the switch unit 32. The signal output unit 31 is electrically connected to the signal line 22 without going through the switch unit 32, and can supply a voltage to the signal line 22 both when the dark signal is read and when the photoelectric conversion signal is read. In the present modified example, the switch unit 32 can be cut and the chip area can be reduced. In addition, it is also possible to increase a light receiving area of the photoelectric conversion unit 11.

MODIFIED EXAMPLE 2

Figure 9:
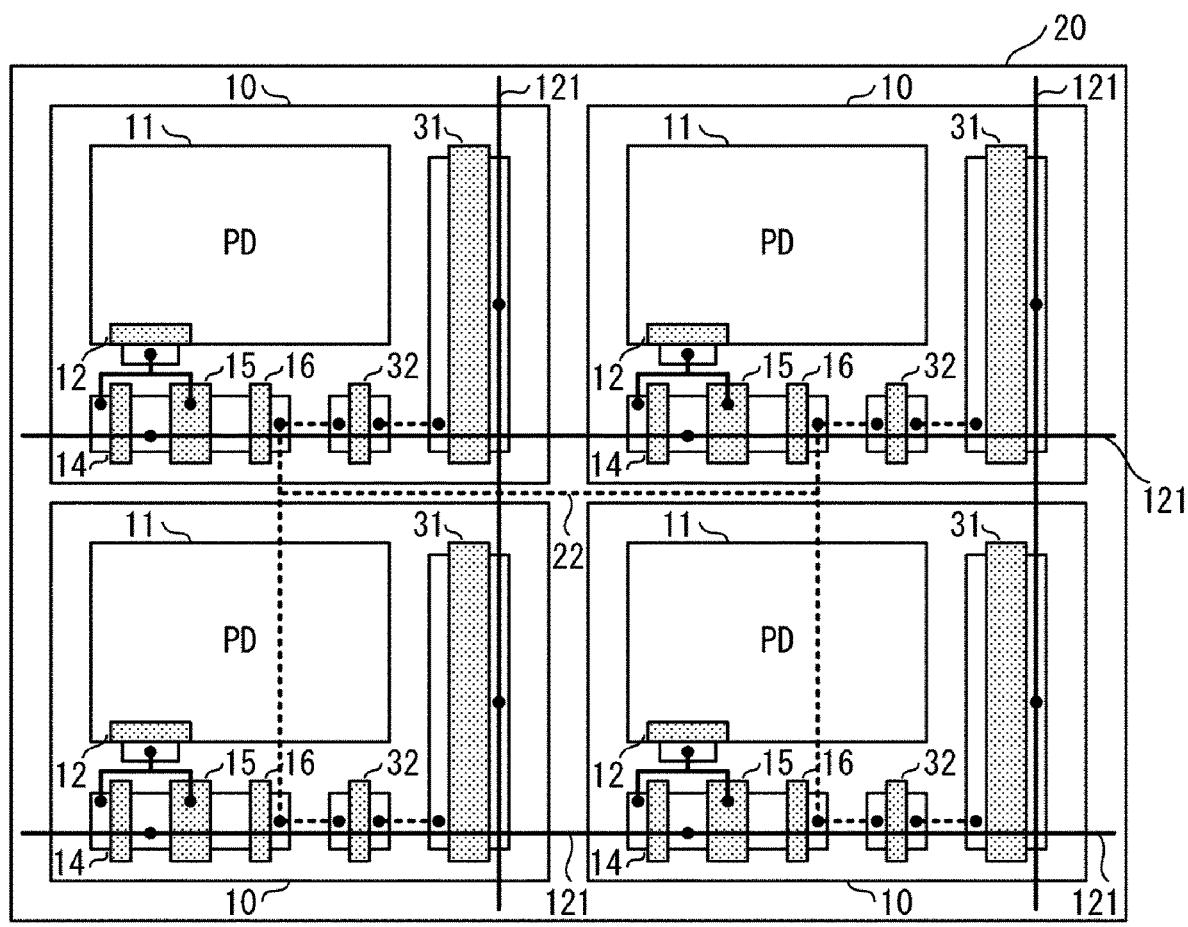
FIG. 9 is a diagram which shows another example of the layout of the part of the imaging element according to the modified example.

FIG. 9 is a diagram which shows an example of a layout of a part of the imaging element according to Modified example 2. As shown in FIG. 9, the signal output unit 31 may be provided for each pixel 10. In the example shown in FIG. 9, four signal output units 31 and four switch units 32 are arranged for each pixel block 20.

The signal CLIP may be supplied by using a separate wiring for each signal output unit 31 or for each of a plurality of signal output units 31. In this case, the number of signal output units 31 connected to one wiring can be reduced, and a signal level of the signal CLIP can be switched at a high speed.

MODIFIED EXAMPLE 3

In the embodiment described above, an example in which the signal line 22 and the supply unit 30 are provided for each pixel block 20 has been described. However, the signal line 22 may be arranged for each pixel 10 and the supply unit 30 may be arranged for each signal line 22. In this case, the pixel control unit 35 may be arranged for each pixel 10 and the supply control unit 36 may be arranged for each supply unit 30. Each supply control unit 36 may control the supply unit 30 provided for each signal line 22 such that a voltage can be supplied at different timings for each signal line 22.

MODIFIED EXAMPLE 4

The pixel 10 and the supply unit 30 are configured by an analog circuit using a MOS transistor. The analog circuit is provided on the first substrate 111, and a digital circuit such as the AD conversion unit 40 is provided on the second substrate 112, separately. An optimum process for the analog circuit can be applied to the first substrate 111, and an optimum process for the digital circuit can be applied to the second substrate 112. In addition, if the pixel 10 and the supply unit 30 are configured by using the same NMOS transistor (or PMOS transistor), it is possible to make it unnecessary to perform well separation. Moreover, by configuring the pixel 10 and the supply unit 30 using the same NMOS transistor, it is possible to shorten a manufacturing process of the imaging element.

The pixel 10 and the supply unit 30 may be configured by using the NMOS transistor or may be configured using the PMOS transistor. The pixel 10 and the supply unit 30 may be configured by using both the NMOS transistor and the PMOS transistor. When the amplification unit 15 and the signal output unit 31 are configured by the NMOS transistor, as described above, the signal CLIP with a lower voltage may also be supplied to the signal output unit 31 when the photoelectric conversion signal is read than when the dark signal is read. When the amplification unit 15 and the signal output unit 31 are configured by the PMOS transistor, a higher voltage signal CLIP may be supplied to the signal output unit 31 when the photoelectric conversion signal is read than when the dark signal is read. The supply unit 30 supplies a voltage to the signal line 22 such that the voltage of the signal line 22 is a value from a power supply voltage (or a ground voltage) to a voltage based on the signal CLIP. The voltage of the signal line 22 is limited by the supply unit 30 to be a value within a range in which the voltage based on the signal CLIP is the upper limit value or the lower limit value.

MODIFIED EXAMPLE 5

In the embodiment described above, an example in which the imaging element 3 is configured by stacking the first substrate 111 and the second substrate 112 has been described. However, the first substrate 111 and the second substrate 112 do not have to be stacked.

MODIFIED EXAMPLE 6

In the embodiment described above, an example in which the imaging element 3 has a back-side irradiation type configuration has been described. However, the imaging element 3 may have a surface irradiation type configuration in which the wiring layer 101 is provided on an incident surface side where light is incident.

MODIFIED EXAMPLE 7

In the embodiment and the modified examples described above, an example in which a photodiode is used as a photoelectric conversion unit has been described. However, a photoelectric conversion film (an organic photoelectric film) may also be used as the photoelectric conversion unit.

MODIFIED EXAMPLE 8

The imaging element and the imaging device described in the embodiment and the modified examples described above may be applied for cameras, smartphones, tablets, cameras embedded in PCs, in-vehicle cameras, cameras mounted on unmanned aerial vehicles (drones, radio-controlled machines, and the like), and the like.

In the description above, various embodiments and modified examples have been described, but the present invention is not limited to these contents. Other aspects considered within the scope of the technical idea of the present invention are also included in the scope of the present invention.

The disclosure content of the following priority basic application is incorporated here as a quotation.

Japanese Patent Application No. 2019-180780 (filed on Sep. 30, 2019)

REFERENCE SIGNS LIST

1 Imaging device
3 Imaging element
4 Control unit
10 Pixel
11 Photoelectric conversion unit
20 Pixel block
30 Supply unit
35 Pixel control unit
36 Supply control unit
40 AD conversion unit
50 Processing unit
60 Reading unit
70 Reading control unit
111 First substrate
112 Second substrate

The invention claimed is:

1. An imaging element, comprising:
a first substrate on which are located
a first pixel block that includes a first photoelectric converter that converts light into an electric charge, and in which a first signal that is based on the electric charge converted by the first photoelectric converter is output to a first signal line;
a second pixel block that (i) includes a second photoelectric converter that converts light into an electric charge and (ii) is arranged in line with the first photoelectric converter in a column direction, and in which a second signal that is based on the electric charge converted by the second photoelectric converter is output to a second signal line;
a first supply unit that supplies a first voltage to the first signal line; and
a second supply unit that supplies a second voltage to the second signal line; and
a second substrate that is stacked together with the first substrate and on which are located
a first processing unit that performs signal processing on the first signal output to the first signal line;
a second processing unit that performs signal processing on the second signal output to the second signal line;
a first pixel controller for reading the first signal from the first pixel block to the first signal line;
a second pixel controller for reading the second signal from the second pixel block to the second signal line;
a first control unit that controls such that, when the first signal is read from the first pixel block to the first signal line by the first pixel controller, the first voltage is supplied from the first supply unit to the first signal line; and
a second control unit that controls such that, when the second signal is read from the second pixel block to the second signal line by the second pixel controller, the second voltage is supplied from the second supply unit to the second signal line.

2. The imaging element according to claim 1, wherein:
the first supply unit controls such that a voltage of the first signal line does not fall below a predetermined voltage; and
the second supply unit controls such that a voltage of the second signal line does not fall below a predetermined voltage.

3. The imaging element according to claim 1, wherein:
the first pixel controller reads a first dark signal from the first pixel block to the first signal line for removing noise included in the first signal;
the second pixel controller reads a second dark signal from the second pixel block to the second signal line for removing noise included in the second signal;
the first control unit controls such that a third voltage different from the first voltage is supplied from the first supply unit to the first signal line when the first dark signal is read from the first pixel block to the first signal line by the first pixel controller; and
the second control unit controls such that a fourth voltage different from the second voltage is supplied from the second supply unit to the second signal line when the second dark signal is read from the second pixel block to the second signal line by the second pixel controller.

4. The imaging element according to claim 3, wherein:
the third voltage is higher than the first voltage; and
the fourth voltage is higher than the second voltage.

5. An imaging device comprising:
the imaging element according to claim 4.

6. The imaging element according to claim 1, wherein:
the first pixel block includes a third photoelectric converter that is arranged adjacent to the first photoelectric converter in the column direction, the third photoelectric converter converting light into an electric charge;
the second pixel block includes a fourth photoelectric converter that is arranged adjacent to the second photoelectric converter in the column direction, the fourth photoelectric converter converting light into an electric charge;
a third signal that is based on the electric charge converted by the third photoelectric converter is output to the first signal line;
a fourth signal that is based on the electric charge converted by the fourth photoelectric converter is output to the second signal line;
the first processing unit performs signal processing on the third signal output to the first signal line;
the second processing unit performs signal processing on the fourth signal output to the second signal line;
the first pixel controller reads the third signal from the first pixel block to the first signal line; and
the second pixel controller reads the fourth signal from the second pixel block to the second signal line.

7. The imaging element according to claim 6, wherein:
the first control unit controls such that the first voltage is supplied from the first supply unit to the first signal line when the third signal is read from the first pixel block to the first signal line by the first pixel controller; and
the second control unit controls such that the second voltage is supplied from the second supply unit to the second signal line when the fourth signal is read from the second pixel block to the second signal line by the second pixel controller.

8. The imaging element according to claim 7, wherein:
the first pixel block includes a fifth photoelectric converter that is arranged adjacent to the first photoelectric converter in a row direction, the fifth photoelectric converter converting light into an electric charge;
the second pixel block includes a sixth photoelectric converter that is arranged adjacent to the second photoelectric converter in the row direction, the sixth photoelectric converter converting light into an electric charge;
a fifth signal that is based on the electric charge converted by the fifth photoelectric converter is output to the first signal line;
a sixth signal that is based on the electric charge converted by the sixth photoelectric converter is output to the second signal line;
the first processing unit performs signal processing on the fifth signal output to the first signal line;
the second processing unit performs signal processing on the sixth signal output to the second signal line;
the first pixel controller reads the fifth signal from the first pixel block to the first signal line; and
the second pixel controller reads the sixth signal from the second pixel block to the second signal line.

9. The imaging element according to claim 8, wherein:
the first control unit controls such that the first voltage is supplied from the first supply unit to the first signal line when the fifth signal is read from the first pixel block to the first signal line by the first pixel controller; and
the second control unit controls such that the second voltage is supplied from the second supply unit to the second signal line when the sixth signal is read from the second pixel block to the second signal line by the second pixel controller.

10. An imaging device comprising:
the imaging element according to claim 9.

11. The imaging element according to claim 1, wherein:
the first pixel block includes a third photoelectric converter that is arranged adjacent to the first photoelectric converter in a row direction, the third photoelectric converter converting light into an electric charge;
the second pixel block includes a fourth photoelectric converter that is arranged adjacent to the second photoelectric converter in the row direction, the fourth photoelectric converter converting light into an electric charge;
a third signal that is based on the electric charge converted by the third photoelectric converter is output to the first signal line;
a fourth signal that is based on the electric charge converted by the fourth photoelectric converter is output to the second signal line;
the first processing unit performs signal processing on the third signal output to the first signal line;
the second processing unit performs signal processing on the fourth signal output to the second signal line;
the first pixel controller reads the third signal from the first pixel block to the first signal line; and
the second pixel controller reads the fourth signal from the second pixel block to the second signal line.

12. The imaging element according to claim 11, wherein:
the first control unit controls such that the first voltage is supplied from the first supply unit to the first signal line when the third signal is read from the first pixel block to the first signal line by the first pixel controller; and
the second control unit controls such that the second voltage is supplied from the second supply unit to the second signal line when the fourth signal is read from the second pixel block to the second signal line by the second pixel controller.

13. An imaging device comprising:
the imaging element according to claim 12.

14. The imaging element according to claim 1, wherein:
the first pixel controller controls accumulation time of the electric charge converted by the first photoelectric converter; and
the second pixel controller controls accumulation time of the electric charge converted by the second photoelectric converter.

15. The imaging element according to claim 14, wherein:
the second pixel controller controls the accumulation time of the electric charge converted by the second photoelectric converter to be different from the accumulation time of the electric charge converted by the first photoelectric converter.

16. An imaging device comprising:
the imaging element according to claim 15.

17. The imaging element according to claim 1, wherein:
the second photoelectric converter is arranged adjacent to the first photoelectric converter in the column direction.

18. The imaging element according to claim 1, further comprising:
an electrode provided on the first substrate and to which a power supply voltage is supplied, wherein:
the first supply unit and the second supply unit are electrically connected to the electrode.

19. The imaging element according to claim 1, wherein:
the first processing unit includes a first converter that converts the first signal output to the first signal line into a digital signal; and
the second processing unit includes a second converter that converts the second signal output to the second signal line into a digital signal.

20. An imaging device comprising:
the imaging element according to claim 1.

* * * * *